(12) United States Patent
Meier et al.

(10) Patent No.: US 11,939,094 B2
(45) Date of Patent: Mar. 26, 2024

(54) METHOD FOR PRODUCING A PORTION UNIT OF A DETERGENT

(71) Applicant: Henkel AG & Co. KGaA, Duesseldorf (DE)

(72) Inventors: Frank Meier, Duesseldorf (DE); Matthias Sunder, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 938 days.

(21) Appl. No.: 16/876,269

(22) Filed: May 18, 2020

(65) Prior Publication Data

US 2020/0362277 A1    Nov. 19, 2020

(30) Foreign Application Priority Data

May 16, 2019  (DE) .......................... 102019207162.7

(51) Int. Cl.
*B65B 3/02*    (2006.01)
*B29C 43/00*   (2006.01)
(Continued)

(52) U.S. Cl.
CPC ............ *B65B 3/022* (2013.01); *B29C 43/003* (2013.01); *B29C 43/10* (2013.01);
(Continued)

(58) Field of Classification Search
CPC .......... B65B 3/022; B65B 3/04; B65B 9/023; B65B 9/042; B65B 11/50; B65B 51/10;
(Continued)

(56) References Cited

U.S. PATENT DOCUMENTS 5,830,548 A * 11/1998 Andersen ................ C04B 28/04
428/152
7,407,923 B2 * 8/2008 Wiedemann ....... C11D 17/0017
510/438
(Continued)

FOREIGN PATENT DOCUMENTS

DE    102012212842 A1   1/2014
DE    102017205549 A1   10/2018
(Continued)

OTHER PUBLICATIONS

EP Search Report Application No. EP 20171557 Completed: Oct. 9, 2020; Received Oct. 13, 2020 17 Pages.
(Continued)

*Primary Examiner* — Dariush Seif
(74) *Attorney, Agent, or Firm* — Bojuan Deng

(57) ABSTRACT

A method for producing a portion unit of a detergent by inserting a base element made from a first film portion into a deep-drawing mold that forms a holding volume from the first film portion, the holding volume having a plurality of chambers spaced apart from one another; pouring at least one detergent composition into the chambers; placing a cover element made from a second film portion onto the filled chambers; connecting the cover element to the base element, which forms a film wrapping, sealing seams being formed between adjacent wall portions of the chambers; removing the portion unit from the deep-drawing mold, wherein the outside of the film wrapping is then wetted at least in the region of the adjacent wall portions and, by pressure being exerted, the sealing seams are compressed and the adjacent wall portions are brought into contact with one another and interconnected.

9 Claims, 2 Drawing Sheets

(51) Int. Cl.

| | |
|---|---|
| *B29C 43/10* | (2006.01) |
| *B29C 65/00* | (2006.01) |
| *B29K 29/00* | (2006.01) |
| *B29L 31/00* | (2006.01) |
| *B65B 3/04* | (2006.01) |
| *B65B 9/02* | (2006.01) |
| *B65B 9/04* | (2006.01) |
| *B65B 11/50* | (2006.01) |
| *B65B 51/10* | (2006.01) |
| *B65D 65/46* | (2006.01) |
| *C11D 17/04* | (2006.01) |

(52) U.S. Cl.
CPC ...... *B29C 66/0014* (2013.01); *B29C 66/0016* (2013.01); *B29C 66/0324* (2013.01); *B29C 66/242* (2013.01); *B29C 66/433* (2013.01); *B29C 66/73793* (2013.01); *B29C 66/919* (2013.01); *B65B 3/04* (2013.01); *B65B 9/023* (2013.01); *B65B 9/042* (2013.01); *B65B 11/50* (2013.01); *B65B 51/10* (2013.01); *B65D 65/46* (2013.01); *C11D 17/042* (2013.01); *B29C 66/723* (2013.01); *B29K 2029/04* (2013.01); *B29L 2031/7174* (2013.01)

(58) Field of Classification Search
CPC ... B29C 43/003; B29C 43/10; B29C 66/0014; B29C 66/0016; B29C 66/0324; B29C 66/242; B29C 66/433; B29C 66/73793; B29C 66/919; B29C 66/723; B65D 65/46; C11D 17/042; B29K 2029/04; B29L 2031/7174

USPC ........................................................ 53/453
See application file for complete search history.

(56) References Cited

U.S. PATENT DOCUMENTS

| | | | |
|---|---|---|---|
| 8,669,219 B2 * | 3/2014 | Wiedemann | B65B 7/02 510/293 |
| 8,754,025 B2 * | 6/2014 | Wiedemann | C11D 17/0047 510/439 |
| 9,868,926 B2 * | 1/2018 | Wiedemann | C11D 17/0039 |
| 2002/0086806 A1 * | 7/2002 | Giblin | C11D 17/042 510/296 |
| 2014/0235522 A1 * | 8/2014 | Wiedemann | C11D 17/0039 510/220 |
| 2017/0057716 A1 * | 3/2017 | Fowler | B65B 1/02 |
| 2018/0282671 A1 * | 10/2018 | Meier | B65D 65/46 |
| 2019/0316066 A1 * | 10/2019 | Ellson | B65D 65/46 |
| 2020/0362277 A1 * | 11/2020 | Meier | B29C 51/08 |
| 2021/0163860 A1 * | 6/2021 | Meier | C11D 3/0084 |
| 2022/0333047 A1 * | 10/2022 | Piorkowski | C11D 3/43 |

FOREIGN PATENT DOCUMENTS

| | | |
|---|---|---|
| EP | 2617659 A1 | 7/2013 |
| EP | 3025848 A1 | 1/2016 |
| EP | 3138899 A1 | 3/2017 |
| WO | 2016055346 A1 | 4/2016 |

OTHER PUBLICATIONS

Search Report DE 10 2019 207 162.7 Completed: Jan. 14, 2020 dated Jan. 14, 2020 7 pages.

* cited by examiner

METHOD FOR PRODUCING A PORTION UNIT OF A DETERGENT

FIELD OF THE INVENTION

The invention relates to a method for producing a portion unit of a detergent, usually also referred to as a detergent sachet, detergent pouch, capsule or pod. Portion units of this type usually comprise a shell made from a water-soluble film which delimits a holding volume in which a detergent composition or the components thereof with a liquid, gel, solid or powder consistency are held in chambers in the desired dosage for a wash cycle. Upon contact with the washing water, the film dissolves and releases the detergent or detergent components.

In common embodiments of portion units of this type, the unit is either designed having just one single chamber as a mono-pouch or mono-capsule or is divided into several chambers as a multi-chamber pouch or capsule (for example duo-capsules). In the case of multi-chamber units, one component of the detergent composition is held in each chamber, it being possible for the components to be the same or different.

The present invention relates to the field of multi-chamber portion units of this type.

BACKGROUND OF THE INVENTION

The portion units are usually produced by means of special deep-drawing packaging machines, using the following steps:

- inserting a base element made from a first water-soluble film portion into a deep-drawing mold comprising at least one cavity so as to form a holding volume from the first water-soluble film portion, the holding volume comprising a plurality of chambers which are spaced apart from one another;
- pouring one or more detergent compositions into the chambers;
- placing a cover element made from a second water-soluble film portion onto the filled chambers;
- connecting the cover element to the base element, thus enclosing the chambers, so as to form a film wrapping, sealing seams being formed between adjacent wall portions of the chambers, at which seams regions of the base element and the cover element are interconnected such that they are directly on top of one another;
- removing the portion unit from the deep-drawing mold.

Multi-chamber portion units of this type, for example filled with liquid detergent, occupy an increasingly important place on the market, since consumers value these modern multi-chamber portion units more than they do single-chamber portion units, for example. However, with the same amount of detergent held therein, multi-chamber portion units generally require a higher amount of water-soluble film for forming the outer shell than single-chamber portion units. One reason for this is that, in some embodiments, the chambers are not only arranged one next to the other, but rather also one on top of the other, meaning that a third film portion is required. In other embodiments, the chambers lie one next to the other, but often have complex contours involving wide sealing seams between the individual chambers. This means that, with the same amount of detergent held therein in ml or g, the film consumption in multi-chamber portion units is approximately 10-50% higher than that in single-chamber portion units.

In the embodiments in which chambers are arranged one next to the other, there is also a further disadvantage in that said chambers occupy a comparatively large area, and the sealing seams between the adjacent chambers are clearly visible. Due to the more or less pronounced hinge effect that inevitably exists, these sealing seams result in the inherent stability of multi-chamber portion units of this type being reduced to an undesirably large extent.

Finally, the user can see an undesirably large amount of plastics material between the individual chambers, and this often casts doubt on the water solubility of the film wrapping used.

There is therefore a need for multi-chamber portion units of which the sealing seams between the individual separate chambers have a significantly reduced width, in order to thereby obtain compact portion units having high structural integrity and excellent properties, e.g. in the filling and packaging line. Such compact and dimensionally stable portion units can be packaged and handled more easily and more quickly, and the sales packaging can also be more compact for the consumer.

BRIEF SUMMARY OF THE INVENTION

The object of the invention is therefore to develop a method of the type mentioned at the outset so as to obtain particularly compact and dimensionally stable multi-chamber portion units of a detergent of which the sealing seams have a significantly reduced width.

According to the invention, this object is achieved by the embodiment of the method described in the claims.

The claims further relate to advantageous developments of the invention.

According to the invention, after the portion unit has been produced, i.e. after it has been removed from the deep-drawing mold, the outside of the film wrapping of the portion unit is wetted at least in the region of the adjacent wall portions and, by pressure being exerted, the sealing seams are compressed and the adjacent wall portions are brought into contact with one another and interconnected.

The film wrapping is wetted according to the invention, for example, on at least one side of the mutually facing adjacent wall portions, e.g. on the side formed by the base element; however, a person skilled in the art can arbitrarily choose where the wrapping is wetted.

Wetting the water-soluble film wrapping according to the invention results in a sticky surface on said wrapping, and therefore, by pressure being subsequently exerted, the adjacent wall regions brought into contact with one another are interconnected in the manner of an adhesive bond and the compressed sealing seam located therebetween is fixed in this compressed position. In other words, the water applied to the surface of the water-soluble film when the film is wetted serves as an adhesive, as is also used, for example, to connect the base element and the cover element when the closed film wrapping of the portion unit is produced.

As a result, a portion unit is obtained which is compressed in the region of the initially necessary sealing seams between adjacent, but separate chambers, the adjacent wall surfaces of the chambers that adjoin the compressed sealing seam and are in contact with one another being adhered together.

It goes without saying that, depending on the embodiment of the portion unit, a sealing seam between two chambers, a plurality of sealing seams between a plurality of chambers, or all sealing seams between all chambers can be compressed in the manner according to the invention. The overall design of the chambers of the portion unit and the arrangement thereof are not changed in this case, but rather only the spatial extent of the sealing seams is reduced or, ideally, the sealing seams are completely eliminated and adjacent wall surfaces of the chambers are joined together and interconnected.

The film wrapping can be wetted, for example, by spraying on a solvent such as water, by applying a water mist or by applying water vapor. A water film can also be applied by means of a print head, stamp, damp rollers or damp brushes, for example along a conveying path for the produced portion units. The water can be, for example, deionized water or an aqueous solution of salts or polymers (PVA, polyacrylates, PVP). Furthermore, the aqueous solution can optionally contain biocides, bitterns or dyes. The solvent can also be applied in a punctiform manner.

The portion units produced using the method according to the invention can advantageously have between 2 and 10 chambers, preferably between 2 and 5 chambers, which chambers can be arranged relative to one another arbitrarily.

According to one proposal of the invention, adjacent chambers have, at their adjacent, mutually facing wall portions that adjoin the relevant sealing seam, complementary convex and concave surfaces, preferably at least one such convex and concave surface, and therefore, during compaction caused by pressure being exerted, a form fit or interlocking connection is achieved between the adjacent chambers, and this has a positive effect on the overall strength of the portion unit.

According to a further proposal of the invention, the sealing seams are compressed from an original initial width of between 1.5 and 10 mm to a visible final width of between 0 and 5 mm.

The water-soluble film portions of the base element and the cover element for forming the film wrapping are preferably formed on the basis of polyvinyl alcohol or from polyvinyl alcohol copolymers together with appropriate additives such as plasticizers, surfactants, bitterns or salts.

A plastics film of this type can be produced, for example, by casting (solvent casting) or blow extrusion. The plastics film can also be formed in one or more layers, for example in two layers. The inside or outside of the film can optionally be printed on or decorated, for example with consumer information and pictograms. The print can be multi-colored, and water-soluble or water-insoluble inks can be used.

According to one proposal of the invention, the base element and the cover element are interconnected so as to form the film wrapping only under the action of water and pressure or under the action of water, pressure and heating to temperatures below 95° C., this connection being established both along the outer boundary edges of the portion unit and between the adjacent chambers in the region of the sealing seams. Alternatively, the connection can also be established only by exposure to temperatures above 90° C.

The pressure for compressing the sealing seams can be exerted on the portion unit in a variety of ways after said unit has been produced and the film wrapping has been wetted. For example, movable pressing surfaces can be provided which act on the portion units from the outside, for example as part of a gripper arm, which can also lift and transport the portion unit. Likewise, after the film wrapping has been wetted, the portion units can be guided along a narrowing conveying path, along which, due to the narrowing, they are subject to external compressive forces that compress the sealing seams in the desired manner and bring the adjacent wall surfaces of the chambers into contact with one another. It is also possible to exert an appropriate level of positive pressure on the portion unit in a pressure vessel in order to compress the sealing seams in the manner described. As soon as the adjacent wall surfaces are in contact with one another as a result of pressure being exerted, due to the surface of the film wrapping that is made sticky by being wetted, they connect to one another in this region and the sealing seams that were previously present at least partially disappear from the view of the portion unit, or are not clearly visible.

The portion units obtained using the method according to the invention that have compressed sealing seams and an adherent bond between adjacent wall portions of the adjacent chambers have an improved appearance, since they are more dimensionally stable and no longer have any sealing seams acting as a hinge.

The capsules according to the invention are also distinguished by a very compact appearance together with significantly reduced visible plastics connections between the individual, still separate chambers.

The portion units compacted in this way facilitate packing, and the volume of containers used for packing can be reduced, while the amount of packed portion units remains the same.

The more compact shape of the capsules has a positive effect on the packaging process, for example on the process for dropping them into the packaging, usually in the form of plastics containers or flexible stand-up pouches. The more compact shape is advantageous in that more detergent portion pouches can be packed into the same size packaging, since the space required for each individual capsule is smaller. This contributes to sustainability. In addition, the improved intrinsic rigidity of the capsules means that better stacking can be achieved in the packaging and the tendency of capsules dropped into the packaging forming cones that protrude from the top of the packaging is reduced. These protruding cones can make it difficult, or even impossible, to put the lid on plastics containers or to seal the films in stand-up pouches, since doing so would crush the capsules.

BRIEF DESCRIPTION OF THE DRAWINGS

Further designs and details of the invention are explained below on the basis of embodiments in the drawings, in which.

DETAILED DESCRIPTION OF THE INVENTION

Figure 1:
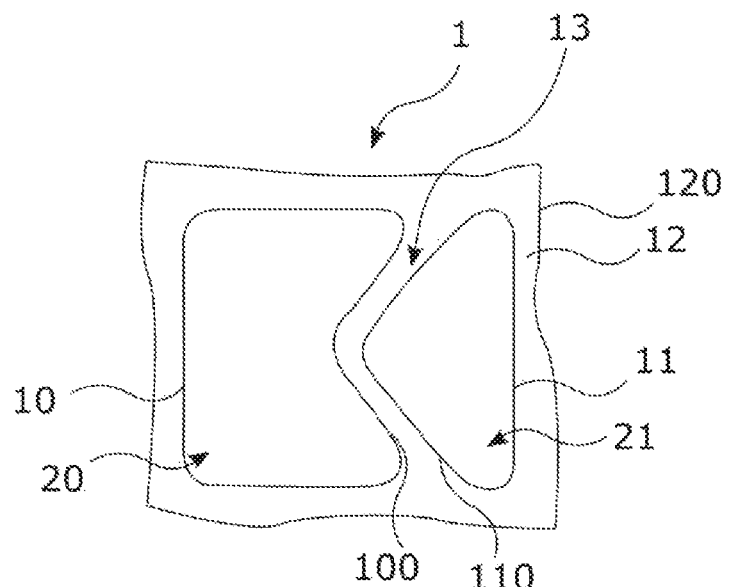
FIG. 1 is a plan view of a first embodiment of a portion unit immediately after it has been produced and before the sealing seams are compressed.

FIG. 1 shows an embodiment of a portion unit 1 of a detergent, which comprises a first chamber 10 and an adjacent further chamber 11, which together form the holding volume of the portion unit 1 and are wrapped in a water-soluble film wrapping (120). Portion units 1 of this type are formed in a manner known per se by inserting a base element made from a first water-soluble film portion, for example based on polyvinyl alcohol, into a deep-drawing mold (not shown) comprising two cavities which correspond to the future chambers 10, 11 such that the cavities are lined with the base element. The cavities lined with the base element are then filled with the detergent components 20, 21 intended for the chambers 10, 11, which components may be in the form of a liquid, gel or powder/solid, for example, specifically in the dosage measured for a wash cycle.

Subsequently, a cover element made from a second water-soluble film portion, for example also based on polyvinyl alcohol, is placed onto the chambers 10, 11 that have been filled in this way and the cover element is connected to the base element, thus enclosing the chambers 10, 11, so as to form the film wrapping 120, for example by applying water and pressure and heating to temperatures below 90° C., by applying temperatures above 90° C., or only under the action of water and pressure.

A peripheral edge seam 12 is formed, which can be trimmed if necessary, for example by means of a laser, and a sealing seam 13 is formed between the two chambers 10, 11, which divides said chambers from one another. Both in the edge seam 12 and in the region of the sealing seam 13, the film portions of the base element and of the cover element lie directly one on top of the other and are sealingly interconnected so as to form the film wrapping 120. The dimensions can be seen from the scale of the figure.

The individual chambers 10, 11 are thus completely and separately wrapped in the closed film wrapping 120, the chambers having, next to the sealing seam 13, two wall portions denoted by reference signs 100, 110 that are adjacent to one another, and yet spaced apart by the sealing seam 13.

Figure 2:
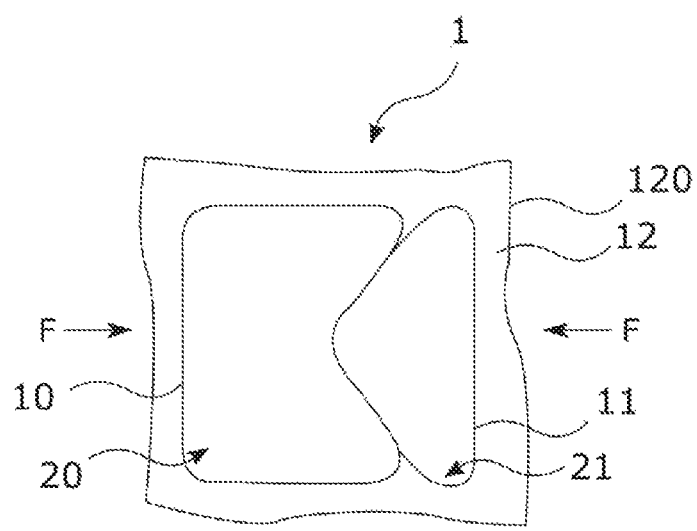
FIG. 2 is a plan view of the portion unit according to FIG. 1 after the sealing seams have been compressed.

By contrast, FIG. 2 shows the portion unit 1 according to FIG. 1 in a final state in which the sealing seam 13 between the chambers 10, 11 has been completely compressed by compressive forces being temporarily exerted in the direction of arrows F such that said seam is no longer visible. This is due to the fact that, as a result of the pressure exerted in the direction of arrow F, the adjacent wall portions 100, 110 of the chambers 10, 11, which are still spaced apart in FIG. 1, come into contact with one another due to the compression of the sealing seam 13 and are adhered to one another in this position, meaning that the spatial extent of the portion unit is also reduced accordingly, as can be clearly seen from the scale of FIG. 2 shown by comparison with FIG. 1.

For this purpose, in a subsequent step after the portion unit 1 shown in FIG. 1 has been removed from the deep-drawing mold, the wall portions 100, 120 adjoining the sealing seam 13 are wetted, for example by the action of water vapor on the outside of the film wrapping 120. This results in the surface of the film wrapping made from water-soluble film being made sticky by being wetted in the region of the wall surfaces 100, 110 next to the sealing seam 13. In any case, the degree of wetting is kept so low that it only produces the desired sticky surface, and does not completely or selectively dissolve the film wrapping 120.

If, for example, as a result of the portion unit 1 being conveyed along a narrowing conveying path, the compressive forces in the direction of arrow F are then applied, the sealing seam 13 is compressed and the wall surfaces 100, 110 come into contact with one another. The surfaces made sticky by being previously wetted bring about an adherent adhesive bond between the wall surfaces 100, 110 coming into contact with one another in the configuration shown in FIG. 2, which then permanently retains the portion unit 1. Since, moreover, the wall surfaces 100, 110 have mutually facing convex and concave surfaces, they are interlockingly connected with a form fit in the configuration shown in FIG. 2, which is reflected in a particular strength of the more compact portion unit 1 according to FIG. 2. In addition, the surface area is reduced by approximately 8% by comparison with the initial configuration according to FIG. 1.

Figure 3:
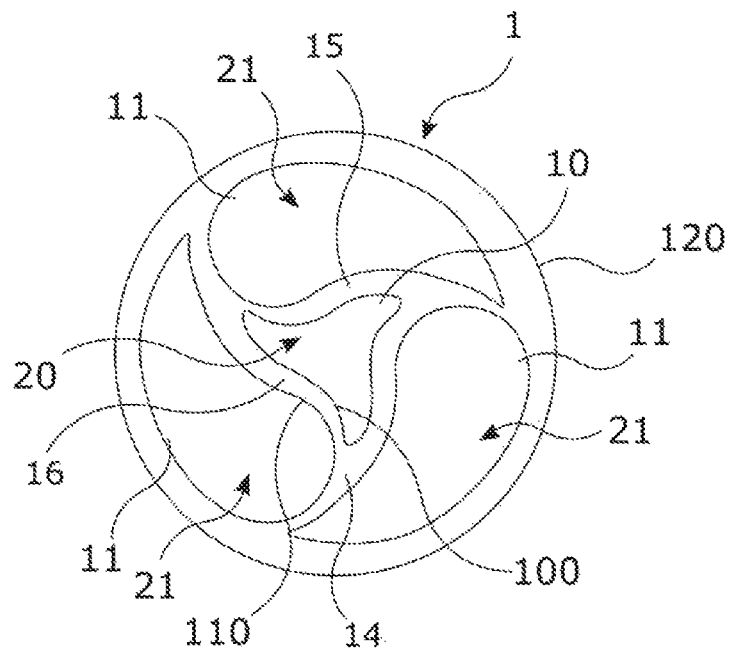
FIG. 3 is a plan view of a second embodiment of a portion unit immediately after it has been produced and before the sealing seams are compressed.
Figure 4:
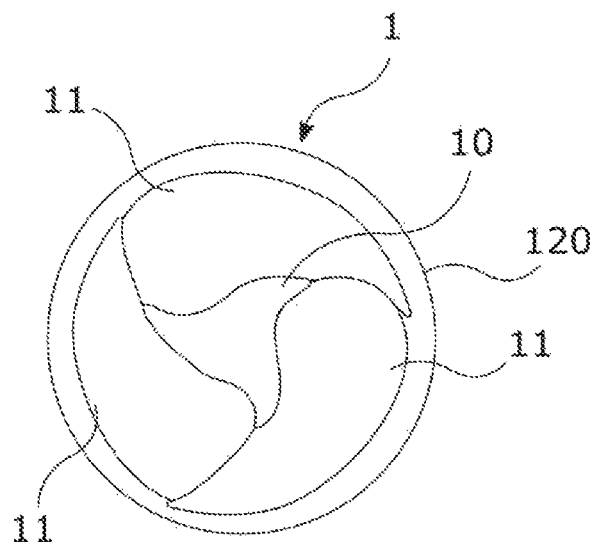
FIG. 4 is a plan view of the portion unit according to FIG. 3 after the sealing seams have been compressed.

In the same way, FIGS. 3 and 4 show a further embodiment of a portion unit 1, in which a central chamber 10 is surrounded by a total of three further chambers 11 in a common plane, which chambers are filled with components 20, 21 of a detergent composition. In the configuration immediately following the production of the portion unit 1 according to FIG. 3, a total of three sealing seams 14, 15, 16 are thus formed between the chambers 10, 11, the wall surfaces 100, 110 of the adjacent chambers 10, 11 adjoining said seams. Furthermore, the portion unit also has a peripheral edge seam 12 in the region of the outer film wrapping.

Also in this embodiment of the portion unit 1 according to FIG. 3, the film wrapping 120 is then wetted, e.g. in the region of the wall surfaces 100, 110 of the chambers 10, 11 that adjoin the sealing seams 14, 15, 16, in order to produce a sticky surface of the adjacent wall surfaces 100, 110. Subsequently, the sealing seams 14, 15, 16 are compressed and the corresponding wall surfaces 100, 110 are brought into contact with one another by a force being applied in the radially inward direction such that the compact configuration according to FIG. 4 is achieved, in which the sealing seams 14, 15, 16 are largely eliminated and adjacent wall surfaces 100, 110 of the chambers 10, 11 are interconnected by surface bonding such that they are in contact with one another.

A comparison with FIG. 3 shows that the total surface area of the portion unit 1 is reduced; in the example shown, the surface area is reduced by approximately 12%.

In addition, this application of force also optimizes the internal pressure of the chamber 10, which leads to an improved visual appearance and better stability of the portion unit 1.

It goes without saying that the above-mentioned compaction in the region of the sealing seams 13, 14, 15, 16 and the connection between the adjacent wall surfaces 100, 110 can also be achieved in any other multi-chamber portion unit 1.

Both selected surface regions of the film wrapping 120 and the entire film wrapping 120 can be wetted in order to subsequently bring the adjoining wall surfaces 100, 110 of the chambers 10, 11 into contact with one another and connect them, as a result of which the sealing seams 13, 14, 15, 16 can no longer be visually seen, or are only perceptible to a significantly lesser extent.

LIST OF REFERENCE SIGNS 1 portion unit
10 chamber
11 further chamber
12 edge seam
13 sealing seam
14 sealing seam
15 sealing seam
16 sealing seam
20 detergent component
21 detergent component
100 wall surface
110 wall surface
120 film wrapping
F force arrow

What is claimed is:

1. A method for producing a portion unit of a detergent, comprising the following steps:
inserting a base element made from a first water-soluble film portion into a deep-drawing mold so as to form a holding volume from the first water-soluble film portion, the holding volume comprising a plurality of chambers which are spaced apart from one another;
pouring at least one detergent composition into the chambers;
placing a cover element made from a second water-soluble film portion onto the filled chambers;
connecting the cover element to the base element, thus enclosing the chambers, so as to form a film wrapping, sealing seams being formed between adjacent wall portions of the chambers;
removing the portion unit from the deep-drawing mold, wherein the outside of the film wrapping is then wetted at least in the region of the adjacent wall portions and, by pressure being exerted, the sealing seams are compressed and the adjacent wall portions are brought into contact with one another and interconnected.

2. The method according to claim 1, wherein the film wrapping is wetted by spraying on solvent applying a solvent mist, applying water vapor, or applying a liquid film by means of a stamp, damp rollers or damp brushes.

3. The method according to claim 2, wherein the film wrapping is wetted by spraying on water or an aqueous solution.

4. The method according to claim 1, wherein the portion unit has two to ten chambers.

5. The method according to claim 1, wherein adjacent chambers have complementary convex and concave wall portions.

6. The method according to claim 1, wherein the sealing seams are compressed from an initial width of between 1.5 and 10 mm to a visible final width of between 0 and 5 mm.

7. The method according to claim 1, wherein the water-soluble film portions of the base element and the cover element are formed on the basis of polyvinyl alcohol and comprise at least one layer.

8. The method according to claim 1, wherein the base element and the cover element are interconnected so as to form the film wrapping under the action of water and pressure, under the action of water and pressure and heating to temperatures below 95° C., or by exposure to temperatures above 90° C.

9. The method according to claim 1, wherein the pressure is applied by movable pressing surfaces or by conveying the portion unit along a narrowing conveying path.

* * * * *